US010305375B2

(12) United States Patent
Kanamori

(10) Patent No.: US 10,305,375 B2
(45) Date of Patent: May 28, 2019

(54) APPARATUS AND SYSTEM FOR NOISE CANCELLATION OF POWER CONVERTERS

(71) Applicant: Takashi Kanamori, San Jose, CA (US)

(72) Inventor: Takashi Kanamori, San Jose, CA (US)

( * ) Notice: Subject to any disclaimer, the term of this patent is extended or adjusted under 35 U.S.C. 154(b) by 227 days.

(21) Appl. No.: 15/483,430

(22) Filed: Apr. 10, 2017

(65) Prior Publication Data
US 2017/0294834 A1 Oct. 12, 2017

Related U.S. Application Data

(63) Continuation of application No. 14/953,067, filed on Nov. 27, 2015, now Pat. No. 9,653,988, and a continuation of application No. 14/076,944, filed on Nov. 11, 2013, now Pat. No. 9,214,857.

(51) Int. Cl.
H02M 1/44 (2007.01)
H02M 3/156 (2006.01)
H02M 3/158 (2006.01)

(52) U.S. Cl.
CPC ............ H02M 1/44 (2013.01); H02M 3/156 (2013.01); H02M 3/158 (2013.01)

(58) Field of Classification Search
CPC ......... H02M 1/44; H02M 3/158; H02M 3/156
See application file for complete search history.

(56) References Cited

U.S. PATENT DOCUMENTS

| 6,911,809 | B2 * | 6/2005 | Kernahan | G05F 3/262 323/283 |
| 7,015,544 | B2 * | 3/2006 | Lotfi | H01L 27/0922 257/336 |
| 7,279,872 | B2 * | 10/2007 | Hackner | H02M 1/08 323/266 |
| 9,214,857 | B2 * | 12/2015 | Kanamori | H02M 1/44 |

* cited by examiner

Primary Examiner — Michael C Zarroli
(74) Attorney, Agent, or Firm — Ariel S. Bentolila; Bay Area IP Group, LLC

(57) ABSTRACT

A system having ring generation device being configured for phase inverted synchronous operation with a primary converter device. The primary converter device is operable to supply power to at least one device. The primary converter device produces a first electromagnetic interference during operation. The ring generation device produces a second electromagnetic interference that cancels the first electromagnetic interference. The primary converter device and the ring generator device are synchronized and operate in an inverse phase with each other to generally cancel the electromagnetic interference signal created by the primary converter device. A ring generation charging switch and a ring generation discharging switch generally turns on and off alternately which matches a charging and discharging of a primary switching node.

10 Claims, 9 Drawing Sheets

APPARATUS AND SYSTEM FOR NOISE CANCELLATION OF POWER CONVERTERS

CROSS-REFERENCE TO RELATED APPLICATIONS

The present continuation patent application claims priority benefit under 35 U.S.C. 120 of the U.S. non-provisional patent application Ser. No. 14/953,067 entitled "An Apparatus and System for Noise Cancellation of Power Converters" filed on 27 Nov. 2015 and Ser. No. 14/076,944 entitled "An Apparatus and System for Noise Cancellation of Power Converters" filed on 11 Nov. 2013. The contents of these related patent applications are incorporated herein by reference for all purposes to the extent that such subject matter is not inconsistent herewith or limiting hereof.

RELATED CO-PENDING U.S. PATENT APPLICATIONS

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to methods of cancellation of electro-magnetic noise. More particularly, the invention relates to methods of cancellation of electro-magnetic noise of switching regulators.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that industrial and consumer electronic devices are known to be powered by battery, direct current (DC), alternating current (AC) or combinations thereof. Whether battery, DC or AC powered the voltage of the power source must often be converted from one voltage to another voltage before it is delivered to an electronic element. An electronic element, in an electronic device, is conventionally referred to as a "load". A load in an electronic device may be a CPU, a memory device, a hard disk, an ASIC (application specific integrated circuit), and so forth. Each load requires a specific voltage to operate. The apparatus that converts one voltage to another is typically called a "converter" or a "power converter". A converter that raises one voltage to another voltage is typically called a "boost converter", and a converter that reduces one voltage to another voltage is typically called a "buck converter". A common type of converter used to convert one voltage to another voltage is a switching power converter (a switching power converter may also be referred to as a switching power supply or a switch mode power supply). Conventionally, a switching power converter will incorporate a switching regulator, and switching regulator circuit, when converting one voltage to another voltage.

The following is another example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is shown in FIG. 1. FIG. 1 illustrates a schematic of an exemplary prior art buck topology switching regulator circuit as may be used in a switching power converter. The buck switching regulator circuit is usually comprised of a switch 100, a diode 110 and a filter, which further may be comprised of an inductor 120 and a capacitor 130. Switch 100 may be a FET, MOSFET, BJT, IGBT or other suitable electronic switching device. During typical operation of the buck switching regulator circuit the switch 100 alternates its state between the on-state and the off-state. As a result, a square wave (FIG. 1) is generated on the switching node 140 of the buck switching regulator circuit. The square wave is then typically rectified by a rectifier or an LC filter (FIG. 1). The diode 110 allows the current to continue to flow through the inductor 120 while the switch 100 alternates between the on-state and the off-state. The output voltage Vo of the buck switching regulator circuit is a function of the duty cycle D (FIG. 1) of the switch 100. Typically, in a buck switching regulator circuit, the time averaged voltage (Vin*D) on the switching node 140 is the same as the output voltage Vo (Vo=Vin*D). The maximum voltage of the square wave is the same as the input voltage Vin because the switch is connected to the input voltage Vin.

The following is yet another example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is shown in FIG. 2. FIG. 2 illustrates a schematic of an exemplary prior art boost topology switching regulator circuit as may be used in a switching power converter. The boost switching regulator circuit is typically comprised of a switch 200, a diode 210, a filter 220 and a capacitor 230. Switch 200 may be a FET, MOSFET, BJT, IGBT or other suitable electronic switching device. The switch 200 is connected after the filter 220 and the output voltage Vo is rectified through the diode 210 when the switch 200 is in the off-state or when the diode 210 conducts. The output voltage Vo of the boost switching regulator circuit is a function of the duty cycle D (FIG. 2) of the switch 200. Since the filter 220 between the input voltage Vin and the switching node 240 rectifies the square wave into the output voltage Vo with no loss, the time averaged voltage on the switching node is the same as the input voltage Vin (FIG.2). The height of the square wave is equal to the output voltage Vo in a boost converter, which is equal to Vin/1−D.

A typical switching regulator circuit, examples of which are described in the previous sections, regulates the output voltage Vo by modulating the widths of the pulses (duty cycle) on the switching node. This method is usually referred to as pulse width modulation (PWM). The voltage on the switching node changes from 0 to Vin, and Vin to 0, in case of a buck switching regulator, and from 0 to Vo, and Vo to 0, in case of a boost switching regulator, in a short period of time (typically within a few nano-seconds).

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that it is well known that, in addition to the buck and boost switching regulator circuit topologies described in the previous sections, various other switching regulator circuit topologies exist in the art and include, by way of example and without limitation, polarity inverting, push-pull, forward converter, half-bridge, full-bridge, flyback, CUK, SEPIC, synchronous, asynchronous, isolated and non-isolated topologies, which may be operating in continuous mode, discontinuous mode, interleaved mode, current mode, voltage mode, voltage fed mode, current fed mode or other modes or combinations thereof as is known in the art.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that it is well known, and described by Faraday's law, that a time varying electromagnetic field induces a counter electromagnetic field which cancels out the original electromagnetic field. The counter electromagnetic field energy is induced and released as electromagnetic noise into the conductor or radiated into the space in the vicinity of the switching node. The electromagnetic energy, or noise, that travels through a conductor is called conducted noise, and the electromagnetic energy or noise that travels through space is called radiated noise. Often these two are differentiated by their frequency bands.

This conducted and radiated electromagnetic noise is often referred to as electromagnetic interference (EMI) and EMI may interfere with operation of electronic devices. EMI may obstruct, interrupt, or degrade the performance of memory devices, CPUs, and application specific integrated circuits (ASIC)'s, for example, on a computing processor board. EMI may also cause audio circuit degradation. Listeners of audio devices may hear audible EMI noise induced by switching regulators used within the audio devices.

Although switching regulators are known to cause EMI, they are frequently used in electronic devices because of their high power conversion efficiencies, low power losses and compact size.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that circuit designer's methods and solutions of addressing switching regulator EMI have typically been passive methods such as installing electrical component filters in noise-susceptible areas or mechanically shielding switching regulators or noise-susceptible electrical devices with metallic nets. Both passive component EMI filtering and metallic net EMI shielding may require bulky and/or costly electrical and mechanical components to be added to a typical electrical device.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
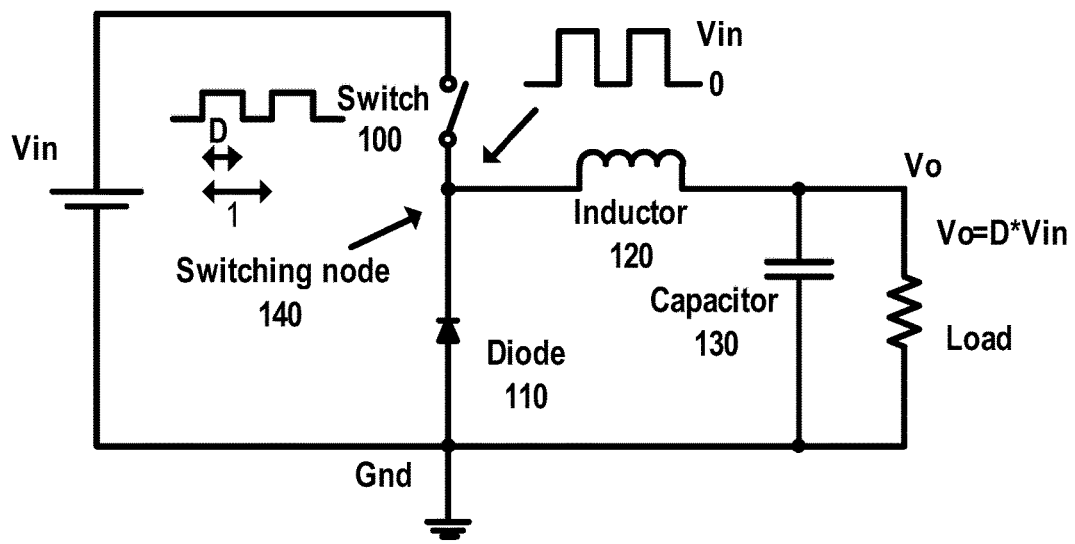
FIG. 1 illustrates a schematic of an exemplary prior art buck topology switching regulator circuit as may be used in a switching power converter.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 3:
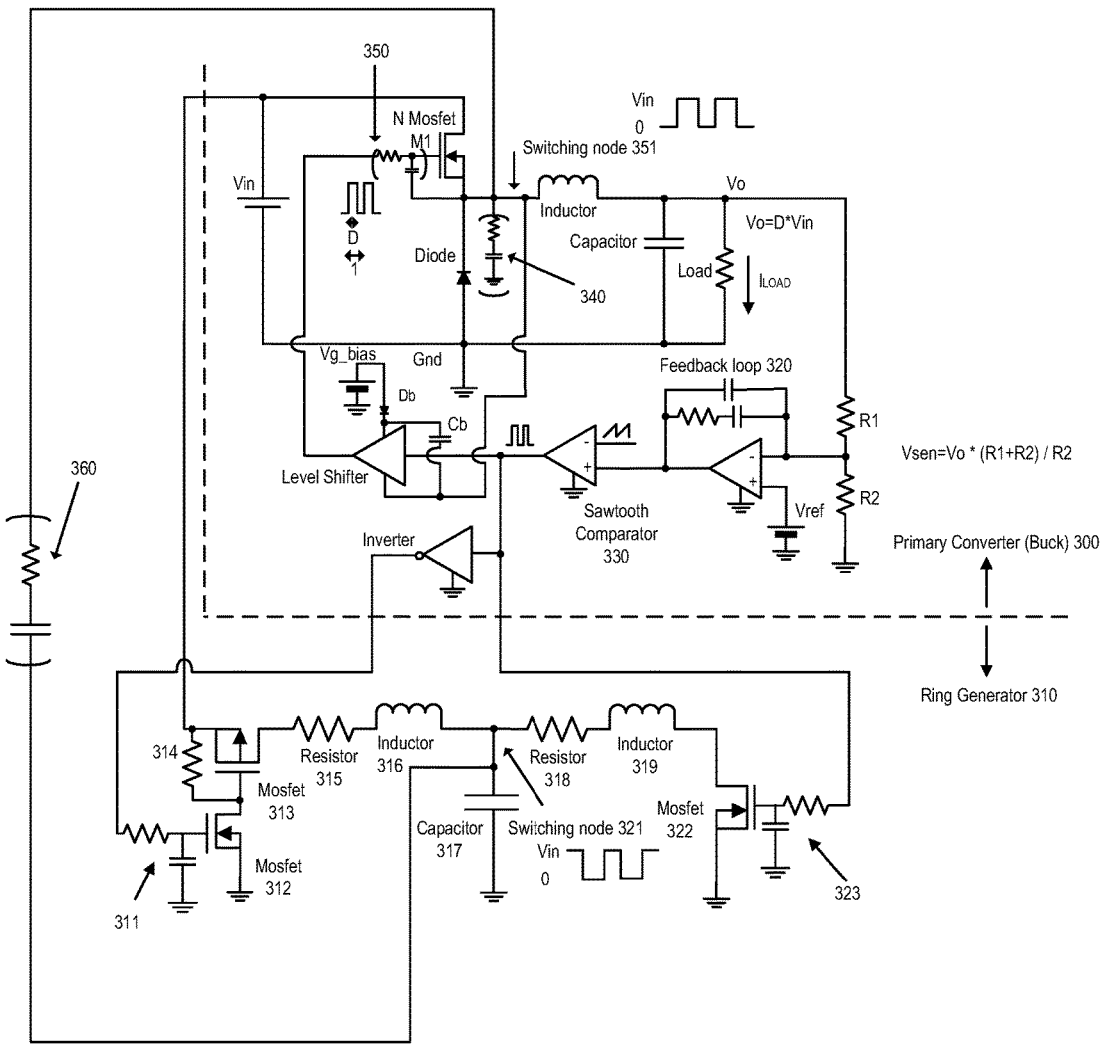
FIG. 3 illustrates a schematic of an exemplary buck or step-down converter primary converter and a ring generator device, in accordance with an embodiment of the present invention.

FIG. 3 illustrates a schematic of an exemplary buck or step-down primary converter 300 and a ring generator device 310, in accordance with an embodiment of the present invention.

In one embodiment, primary converter 300 comprises a buck or step-down converter circuit and may deliver power to a load, while the ring generator device 310 may operate side by side. Typically, the ring generator device 310 is located in close physical proximity to the primary converter 300. Optionally, as a non-limiting example, the ring generator device 310 and the primary converter 300 may be implemented on a common printed circuit assembly substrate, on a common integrated circuit substrate, or equivalent thereof.

In a non-limiting example, the source voltage of the ring generator device 310 may be equal to the input voltage of the primary converter 300. The ring generator device may operate in synchronization with the primary converter since its gate drive is fed by the same clock (the output of the comparator 330) as that of the primary converter. When the FET M1 is turned off, the switching node 351 of the primary converter 300 is being discharged or going down in voltage because the free-wheeling diode is turned on. The P-FET 313 is turned on at the same time as the FET M1 is turned off, so that the switching node 321 of the ring generator device 310 is charged or going up in voltage. Reversely when the FET M1 is turned on, the switching node 351 of the primary converter 300 is being charged or going up in voltage. The P-FET 313 is turned off and instead the N-FET 322 is turned on at the same time as the FET M1 is turned on, so that the switching node 321 of the ring generator device is discharged or going down in voltage. As a result, the switching node 321 of the ring generator device is in an inverse phase with that of the primary converter. The clock signal from the output of the comparator 330 needs to be inverted to drive P-FET 313 alternately with N-FET 322. The gate driving N-FET 312 and the pull-up resistor 314 are both required to drive the P-FET 313. By adjusting the values of the RC networks 350, 311 and 323, the timing of each gate drive may be aligned precisely. Optionally the RC network 360 may be added between the switching node of the primary converter 351 and the that of the ring generator device 321 to couple those two nodes more strongly than the parasitic capacitance and resistance of air and/or substrate.

Figure 4:
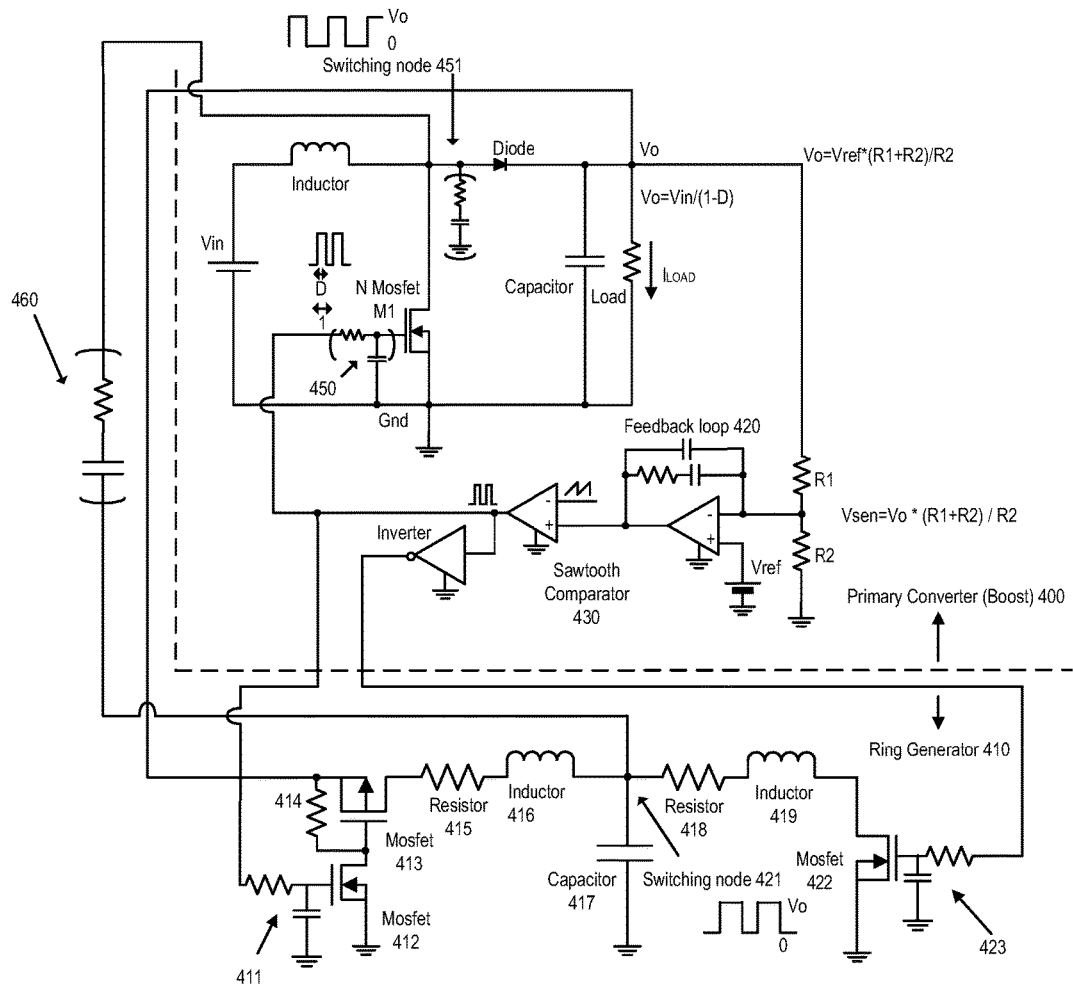
FIG. 4 illustrates a schematic of an exemplary boost or step-up primary converter and a ring generator device, in accordance with an embodiment of the present invention.

FIG. 4 illustrates a schematic of an exemplary boost or step-up primary converter 400 and a ring generator device 410, in accordance with an embodiment of the present invention.

In an embodiment, primary converter 400 comprises a boost converter circuit and may deliver power to a load, while the ring generator device 410 may operate side by side. Typically, the ring generator device 410 is located in close physical proximity to the primary converter 400. Optionally, as a non-limiting example, the ring generator device 410 and the primary converter 400 may be implemented on a common printed circuit assembly substrate, on a common integrated circuit substrate, or equivalent thereof. The primary converter and the ring generator device may be perceived as one entity by ASICs.

In a non-limiting example, the source voltage of the ring generator device 410 is generally equal to the output voltage of the primary converter 400. The ring generator device is operable to operate in synchronization with the primary converter because its gate drive is fed by the same clock (the output of the comparator 430) as that of the primary converter. When the FET M1 is turned on, the switching node of the primary converter 451 is being discharged or going down in voltage. The P-FET 413 is turned on at the same time as the FET M1 is turned on, so that the switching node 421 of the ring generator device is charged or going up in voltage. Reversely when the FET M1 is turned off, the switching node of the primary converter 451 is being charged or going up in voltage because the free-wheeling diode is turned on. The P-FET 413 is turned off and instead the N-FET 422 is turned on at the same time as the FET M1 is turned off, so that the switching node 421 of the ring generator device is discharged or going down in voltage. As a result, the switching node of the ring generator device is in an inverse phase with that of the primary converter. The clock signal from the output of the comparator 430 needs to be inverted to drive N-FET 422 alternately with P-FET 413. The gate driving N-FET 412 and the pull-up resistor 414 are both required to drive the P-FET 413. By adjusting the values of the RC networks 450, 411 and 423, the timing of each gate drive may be aligned precisely. Optionally the RC network 460 may be added between the switching node of the primary converter 451 and ring generator device 421 to couple those two nodes more strongly than the parasitic capacitance and resistance of air and/or substrate.

Figure 5A:
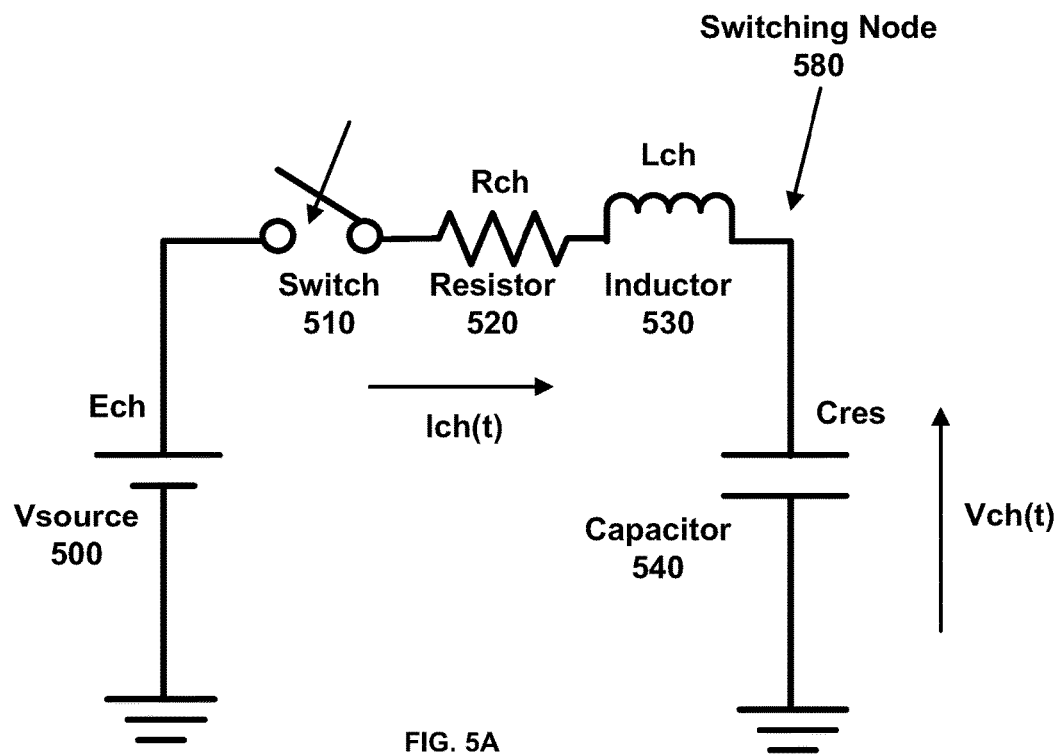
FIG. 5A illustrates a schematic of an exemplary ring generator device topology when it is being charged, in accordance with an embodiment of the present invention.

FIG. 5A illustrates a schematic of an exemplary charging ring generator device topology when it is being charged, the moment switch 510 closes, in accordance with an embodiment of the present invention. In a non-limiting example, Ech is the charging voltage provided at Vsource 500. Rch is the total series resistance across Resistor 520 in the charging path. Lch is the total series inductance across Inductor 530 in the charging path. And, Cres is the total parallel capacitance across Capacitor 540.

Figure 5B:
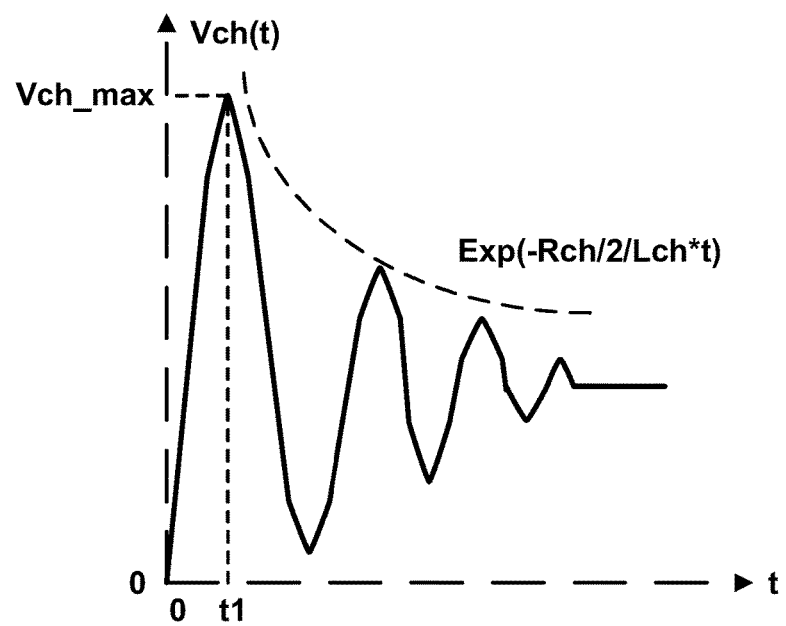
FIG. 5B illustrates a schematic of an exemplary waveform of a ring generator device when it is being charged, in accordance with an embodiment of the present invention.

FIG. 5B shows an exemplary waveform of the charging ring generator device when it is being charged, in accordance with an embodiment of the present invention. The following equations stand by Kirchhoff's law from the moment the switch 510 closes.

$$Ich(t) = Cres \cdot \frac{dVch(t)}{dt} \qquad \text{eq. (1)}$$

$$Ech = Rch \cdot Ich(t) + Lch \cdot \frac{dIch(t)}{dt} + Vch(t) \qquad \text{eq. (2)}$$

Then, $$Ech = Rch \cdot Cres \cdot \frac{dVch(t)}{dt} + Lch \cdot Cres \frac{d^2 Vch(t)}{dt^2} + Vch(t) \qquad \text{eq. (3)}$$

Eq. (3) is a second order linear differential equation, so the Laplace transform may be applied.

$$\frac{Ech}{s} = Rch \cdot Cres \cdot s \cdot Vch(s) + Lch \cdot Cres \cdot s^2 \cdot Vch(s) + Vch(s) \qquad \text{eq. (4)}$$

$$Vch(s) = \frac{Ech}{s} \cdot \frac{1}{Lch \cdot Cres \cdot s^2 + Rch \cdot Cres \cdot s + 1} \qquad \text{eq. (5)}$$

Eq. (5) may be decomposed to partial fractions as follows, $$Vch(s) = \frac{Ech}{s} - \frac{Ech\left(s + \frac{Rch}{Lch}\right)}{s^2 + \frac{Rch}{Lch}s + \frac{1}{Lch \cdot Cres}} \qquad \text{eq. (6)}$$

Since the objective of the ring generator device is to cause the sinusoidal decay waveform, the discriminant of $$s^2 + \frac{Rch}{Lch}s + \frac{1}{Lch \cdot Cres}$$

may be made negative.

$$D = \left(\frac{Rch}{Lch}\right)^2 - \frac{4}{Lch \cdot Cres} < 0 \qquad \text{eq. (7)}$$

Then, eq. (6) may be written as, $$Vch(s) = \frac{Ech}{s} - \frac{Ech\left(s + \frac{Rch}{Lch}\right)}{\left(s + \frac{Rch}{2Lch}\right)^2 + \frac{1}{Lch \cdot Cres} - \left(\frac{Rch}{2Lch}\right)^2} \qquad \text{eq. (8)}$$

$$Vch(s) = \frac{Ech}{s} - \frac{Ech\left(\left(s + \frac{Rch}{2Lch}\right) + \frac{Rch}{2Lch}\right)}{\left(s + \frac{Rch}{Lch}\right)^2 + \frac{1}{Lch \cdot Cres} - \left(\frac{Rch}{2Lch}\right)^2} \qquad \text{eq. (9)}$$

Eq. (9) may be inverse-Laplace transformed as follows, $$Vch(t) = Ech \cdot \left(1 - e^{-\frac{Rch}{2Lch}t} \cdot \cos\left(\sqrt{\frac{1}{Lch \cdot Cres} - \left(\frac{Rch}{2Lch}\right)^2} \cdot t\right) - \frac{Rch}{2Lch \cdot \sqrt{\frac{1}{Lch \cdot Cres} - \left(\frac{Rch}{2Lch}\right)^2}} \cdot e^{-\frac{Rch}{2Lch}t} \cdot \sin\left(\sqrt{\frac{1}{Lch \cdot Cres} - \left(\frac{Rch}{2Lch}\right)^2} \cdot t\right)\right) \qquad \text{eq. (10)}$$

Eq. (10) becomes maximum at $$t = t1 = \frac{\pi}{\sqrt{\frac{1}{Lch \cdot Cres} - \left(\frac{Rch}{2Lch}\right)^2}} \qquad \text{eq. (11)}$$

because the cosine term becomes −1 and the sine term becomes 0. At t=t1, eq. (10) becomes, $$Vch(t1) = Ech \cdot \left(1 + e^{-\frac{\pi}{\sqrt{\frac{4Lch}{Cres \cdot Rch^2} - 1}}}\right) \qquad \text{eq. (12)}$$

For example, Ech=12V, Lch=2 nH, Rch=2 ohm, Cres=100 pF. The maximum voltage is calculated by eq. (11) and eq. (12). At t=t1=1.44 nsec, the switching node ringing voltage 580 may become maximum at 17.84V. The sinusoidal waveform exponentially generally decays to its 8% of the initial value after 5 nsec. The power loss of the ring generator device is only a capacitive charging power of Cres, and may be calculated as $$\text{Pr\_loss} = \frac{1}{2} Cres \cdot Ech^2 \cdot fs = 7.2 \text{ mW}$$

for a fs=1 MHz switching frequency. In this way, without consuming DC power, the ring generator device may produce a decaying sinusoidal voltage on the switching node 580 with the arbitrary peak voltage, frequency, and decaying factor, by generally adjusting Ech, Lch, Rch, and/or Cres.

Figure 6A:
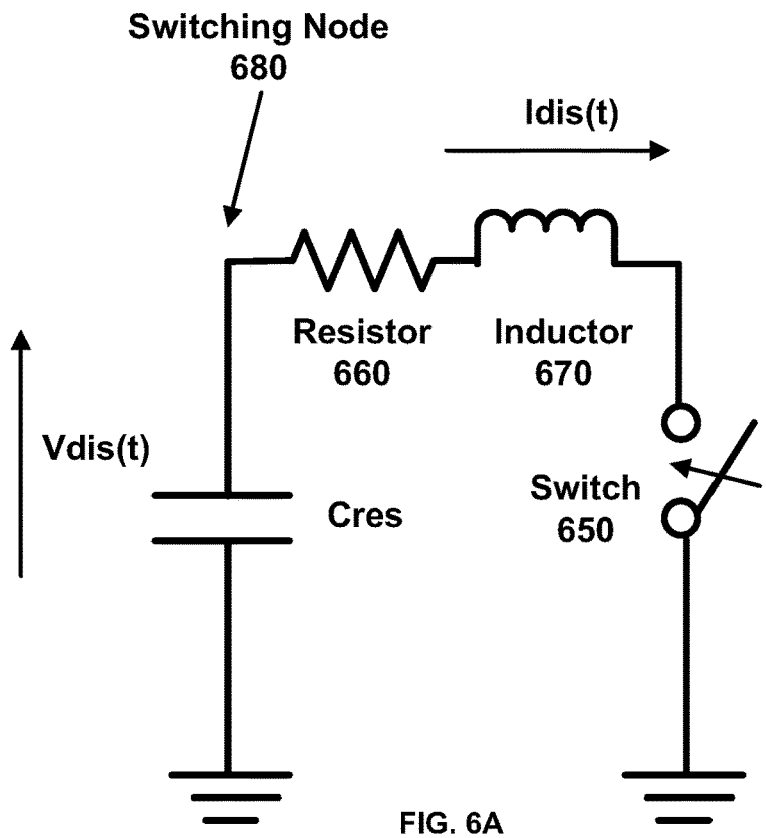
FIG. 6A illustrates a schematic of an exemplary ring generator device topology when it is being discharged, in accordance with an embodiment of the present invention.

FIG. 6A illustrates a schematic of an exemplary ring generator device topology when it is being discharged, in accordance with an embodiment of the present invention. Ech is the same charging voltage from the previous calculation, Rdis is the total series resistance across Resistor 660 in the discharging path, Ldis is the total series inductance across Inductor 670 in the discharging path, and Cres is the total parallel capacitance. Closing switch 650 enables the discharge of the ring generator device.

Figure 6B:
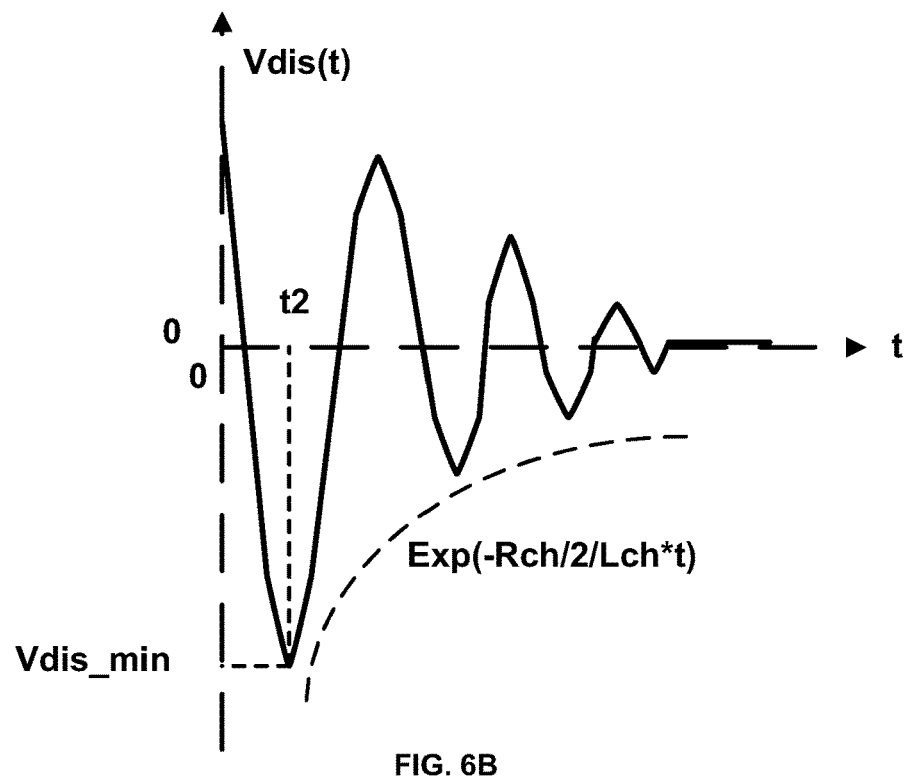
FIG. 6B illustrates a schematic of an exemplary waveform of a ring generator device when it is being discharged, in accordance with an embodiment of the present invention.

FIG. 6B illustrates a schematic of an exemplary waveform of a ring generator device when it is being discharged, in accordance with an embodiment of the present invention. In a non-limiting example, the waveform shows the voltage at the switching node 680. Ech is the same charging voltage from the previous calculation, Rdis is the total series resistance in the discharging path, Ldis is the total series inductance in the discharging path, and Cres is the total parallel capacitance. The following equations stand by Kirchhoff's law from the moment the switch 650 closes.

$$Idis(t) = -Cres \cdot \frac{dVdis(t)}{dt} \qquad \text{eq. (13)}$$

$$Vdis(t) = Rdis \cdot Idis(t) + Ldis \cdot \frac{dIch(t)}{dt} \qquad \text{eq. (14)}$$

If the calculation is done in the same manner, and the initial condition of Vdis(0)=Ech is used, Vdis(t) may be calculated as follows, $$Vdis(t) = Ech \cdot e^{-\frac{Rdis}{2Ldis}t} \cdot \left(\cos\left(\sqrt{\frac{1}{Ldis \cdot Cres} - \left(\frac{Rdis}{2Ldis}\right)^2} \cdot t\right) + \frac{Rdis}{2Ldis \cdot \sqrt{\frac{1}{Ldis \cdot Cres} - \left(\frac{Rdis}{2Ldis}\right)^2}} \cdot \sin\left(\sqrt{\frac{1}{Ldis \cdot Cres} - \left(\frac{Rdis}{2Ldis}\right)^2} \cdot t\right)\right) \qquad \text{eq. (15)}$$

Eq. (15) becomes minimum at $$t = t2 = \frac{\pi}{\sqrt{\frac{1}{Ldis \cdot Cres} - \left(\frac{Rdis}{2Ldis}\right)^2}}, \qquad \text{eq. (16)}$$

because the cosine term becomes −1 and the sine term becomes 0. At t=t2, eq. (15) becomes, $$Vdis(t2) = -Ech \cdot e^{-\frac{\pi}{\sqrt{\frac{4Ldis}{Cres \cdot Rdis^2}-1}}} \quad \text{eq. (17)}$$

For example, Ech=12V, Ldis=3 nH, Rdis=0.5 ohm, Cres=100 pF. The minimum voltage is calculated by eq. (16) and eq. (17). At t=t2=1.72 nsec., the switching node ringing voltage 680 becomes minimum at −10.40V. The sinusoidal waveforms exponentially decays to its 66% of the initial value after 5 nsec. The power loss of the ring generator device is only a capacitive discharge power of Cres, and may be calculated as $$Pr\_loss = \frac{1}{2} Cres \cdot Ech^2 \cdot fs = 7.2 \text{ mW}$$

for a fs=1 MHz switching frequency. In this way, without consuming DC power, the ring generator device may produce a decaying sinusoidal voltage on the switching node 680 with the arbitrary peak voltage, frequency, and decaying factor, by generally adjusting Ech, Ldis, Rdis, and Cres.

Figure 2:
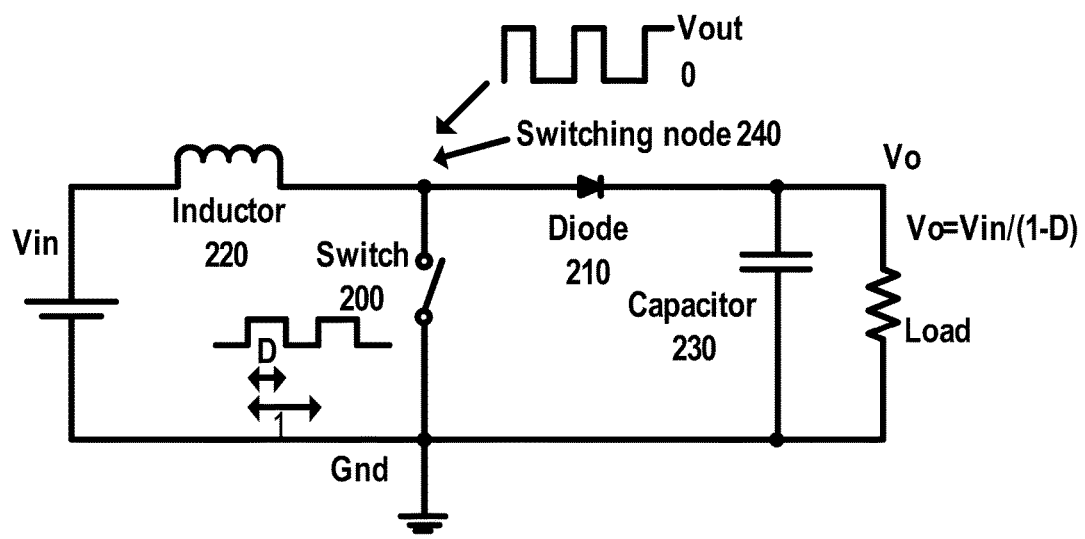
FIG. 2 illustrates a schematic of an exemplary prior art boost topology switching regulator circuit as may be used in a switching power converter.
Figure 7:
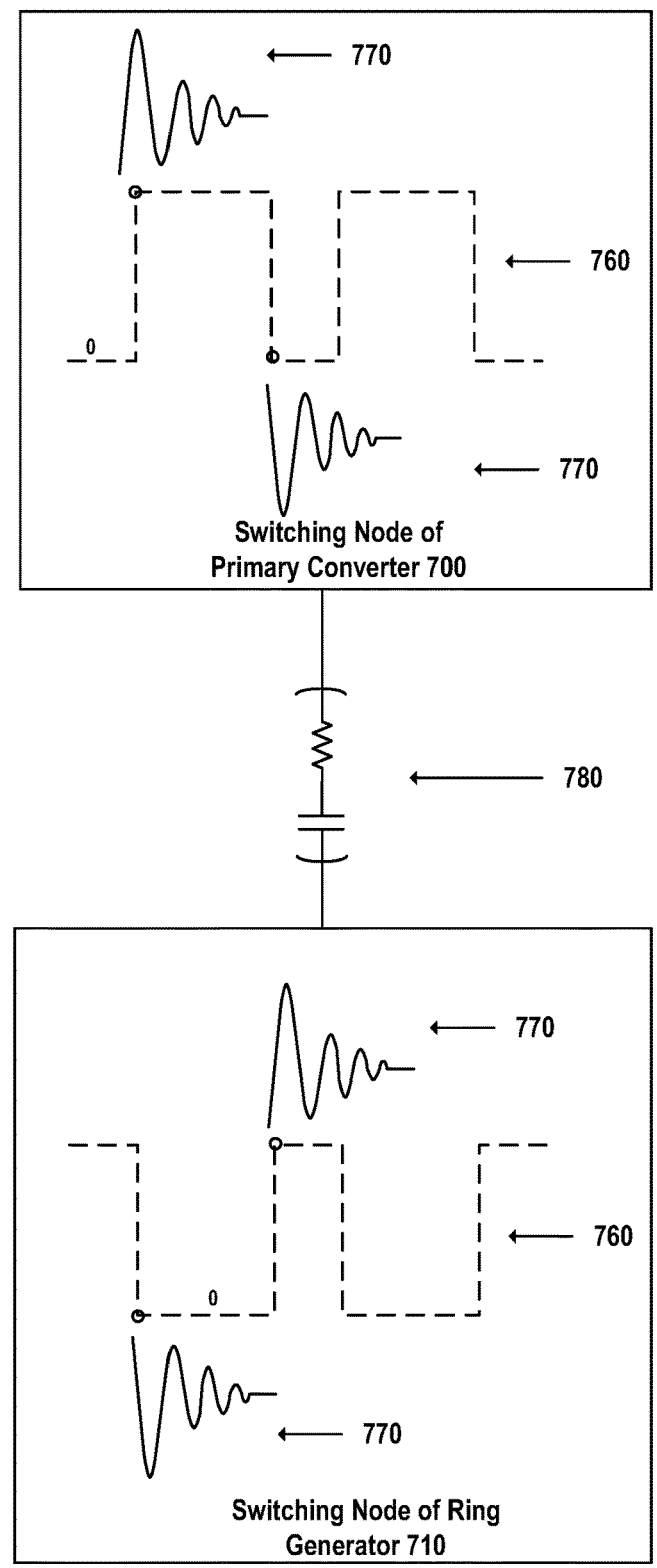
FIG. 7 illustrates a diagram of an exemplary system with an RC network component coupling or connecting a switching node of a primary converter to a switching node of a ring generator device, in accordance with an embodiment of the present invention.

FIG. 7 illustrates a diagram of an exemplary system with an RC network component coupling or connecting a switching node of a primary converter to a switching node of a ring generator device, in accordance with an embodiment of the present invention. In a non-limiting example, two electro-magnetic interference signals, one from the primary converter, and the other from the noise generator, may be in inverse phase with each other and have equal amplitudes, frequency, and damping factor. The electro-magnetic interference signal of the ring generator device, or the switching node noise on the ring generator device may match that of the primary converter in the amplitude, the frequency and the damping factor by generally adjusting Ech, Rch, Lch, Cres for charging (eq. 10), and Ech, Rdis, Ldis, Cres for discharging (eq. 15). The phase of the ring generator device is mostly in inverse relationship with that of the primary converter because when the switching node of the primary converter is charged, that of the ring generator device is discharged, and when the switching node of the primary converter is discharged, that of the ring generator device is charged (FIGS. 2 and 3). The primary converter and the ring generator device normally operate side by side and in proximity to each other. The RC network 780 may be a parasitic capacitance and a parasitic resistance of air and/or an individual capacitance and an individual resistance for the stronger coupling of two electro-magnetic interference signals. The electro-magnetic interference signal of the primary converter and that of the ring generator device together may create the algebraic sum by traveling in the air or in the common substrate. The RC network coupling the switching node of the primary converter and that of the ring generator device for the most part creates much more direct algebraic summing effect than the parasitic capacitance in the air or the common substrate does.

Figure 8:
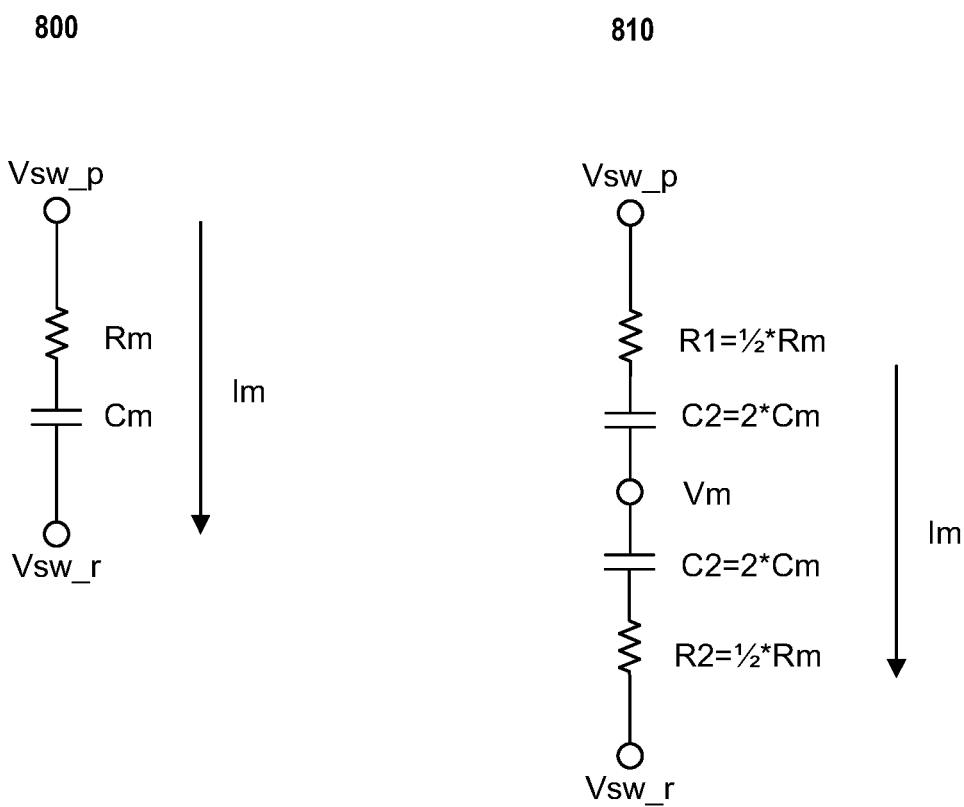
FIG. 8 shows an RC network component, in accordance with an embodiment of the present invention.

FIG. 8 shows the RC network 800 coupling the first switching node and the secondary switching node. In a non-limiting embodiment, the RC network includes a resistor Rm and a capacitor Cm. If the eq. (18) and the eq. (19) are satisfied, the RC network 800 becomes equivalent to the RC network 810. The point Vm is the artificial midpoint of the two switching nodes.

$$R_1 = R_2 = \frac{1}{2} R_m \quad \text{eq. (18)}$$

$$C_1 = C_2 = 2C_m \quad \text{eq. (19)}$$

Since Vm sees the equal impedance from itself to both Vsw_p and Vsw_r, Vm is the arithmetic average voltage of Vsw_p and Vsw_r.

$$V_m = \frac{1}{2}(V_{sw\_p} + V_{sw\_r}) \quad \text{eq. (20)}$$

The current going from the primary switching node to the secondary switching node is Im. Therefore, the primary switching node voltage Vsw_p is calculated to be, $$V_{sw\_p} = V_m + \left(R_1 + \frac{1}{C_1 * s}\right) I_m, \quad \text{eq. (21)}$$

where s is s-plane impedance. Plugging in eq. (20) into eq. (21) gives, $$V_{sw\_p} = \frac{1}{2}(V_{sw\_p} + V_{sw\_r}) + (R_1 C_1 s + 1) \frac{I_m}{C_1 s}. \quad \text{eq. (22)}$$

The corner frequency of eq. (22) is $\frac{1}{2\pi R_1 C_1}$ or $\frac{1}{2\pi R_m C_m}$.

Therefore, above the corner frequency, eq. (22) approaches eq. (23).

$$\text{If } f > \frac{1}{2\pi R_m C_m}, \text{ then,} \quad \text{eq. (23)}$$

$$V_{sw\_p} \approx \frac{1}{2}(V_{sw\_p} + V_{sw\_r}) + R_1 I_m.$$

If R1 or Rm approaches 0, then eq. (23) approaches eq. (24).

$$\text{If } R_1 \to 0 \text{ or } R_m \to 0, \text{ then} \quad \text{eq. (24)}$$

$$V_{sw\_p} \approx \frac{1}{2}(V_{sw\_p} + V_{sw\_r})$$

Then $$V_{sw\_p} \approx V_{sw\_r} \quad \text{eq. (25)}$$

If the high frequency component (770 in FIG. 6) of the electro-magnetic interference signal of the primary converter and that (770 in FIG. 6) of the ring generator device are equal in amplitude, frequency and in an inverse phase, then Vsw_p and Vsw_r should be in general equal in amplitude and in inverse phase with each other as well. Thus, $$V_{sw\_p} \approx -V_{sw\_r} \quad \text{eq. (26)}$$

Plugging in the eq. (26) into the eq. (25) gives the following, $$V_{sw\_p} \approx V_{sw\_r} \approx 0 \qquad \text{eq. (27)}$$

Eq. (27) suggests that if Rm and Cm are properly selected and the high frequency component (770) in FIG. 6 of the electro-magnetic interference signal of the primary converter and that (770) in FIG. 6 of the ring generator device are matched in amplitude, frequency and in an inverse phase, the high frequency $$f > \frac{1}{2\pi R_m C_m}$$

electro-magnetic interference signals emitted by the two switching nodes may be cancelled or substantially reduced. Hence, a unique system and process to match the high frequency component of the electromagnetic interference signal of the primary converter and that of the ring generator device in amplitude and frequency has been explained and provided mathematically.

Figure 9:
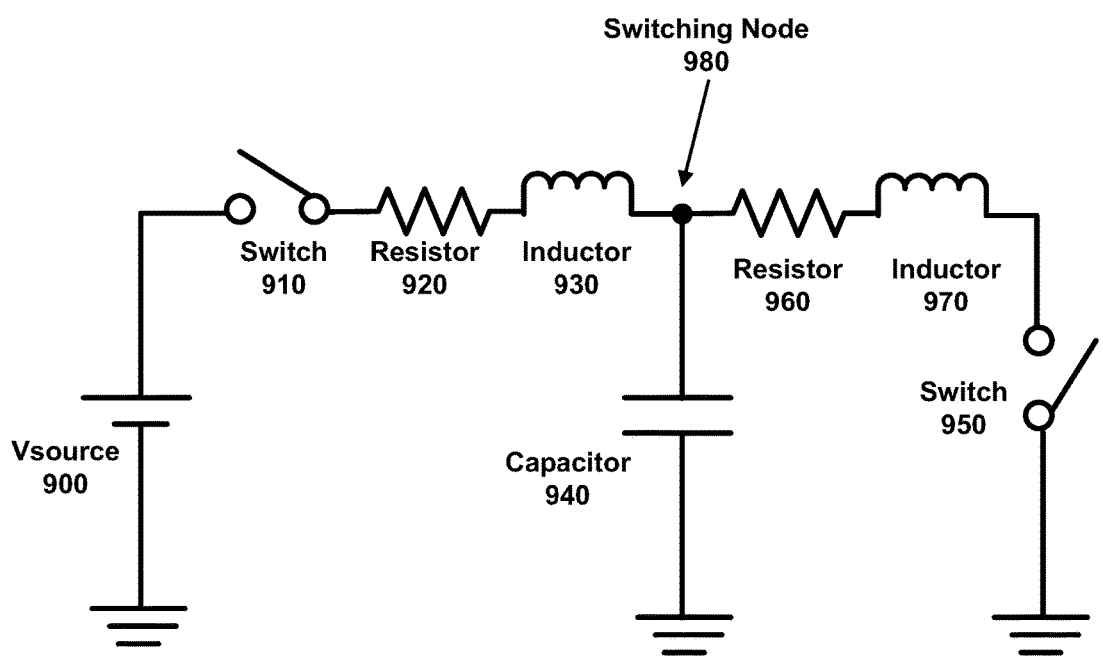
FIG. 9 illustrates a schematic of an exemplary ring generator device, in accordance with an embodiment of the present invention.

FIG. 9 illustrates a schematic of an exemplary representation of the ring generator device (310/410), in accordance with an embodiment of the present invention. In a non-limiting embodiment, the ring generator device includes charging switch 910, the charging inductance across Inductor 930, the charging resistance across Resistor 920, the discharging switch 950, the discharging inductance across Inductor 970, the discharge resistance across Resistor 960, and the capacitance across Capacitor 940. The ring generator device generates the ringing waveform that is in inverse phase with the primary converter and has equal amplitude. When Capacitor 940 is charged or discharged, this creates (total inductance L)×(total Capacitance C) ringing. The frequency of the ringing is determined by the (total inductance L)×(total capacitance C). The damping factor is determined by the total resistance R. If C, R, and L are carefully selected, the ringing generator generates the counter noise that matches the amplitude, the frequency and the damping factor of those of the primary converter, but is in inverse phase with the primary converter. The electro-magnetic interference signal from the primary converter and the electro-magnetic interference signal from the ring generator device (310/410) cancel each other out by law of superposition. Therefore, the switching noise of the power converter is eliminated.

In a non-limiting example, the charging switch 910 and the discharging switch 950 may be N-MOSFET, P-MOSFET, NPN-Bipolar Transistor, PNP-Bipolar Transistor. The charging inductance 930 and the discharging inductance 970 may be a lump sum or solo of the parasitic inductance of the trace and/or the package and/or the die, and the individual inductor. The charging resistance 920 and the discharging resistance 960 may be a lump sum or solo of the parasitic resistance of the trace and/or the package and/or the die, and the individual resistor. The capacitance 940 may be a lump sum or solo of the parasitic capacitance of the trace and/or the package and/or the die, and the individual capacitance.

The source voltage at Vsource 900 of the ring generator device may be the input voltage of the primary converter, the output voltage of the primary converter, or any arbitrary voltage source. When a voltage at the switching node (351/451) of the primary converter (300/400) is being discharged or going down in voltage, the charging switch 910 of the ring generator device is turned on to charge the voltage at the switching node 980 of the ring generator device or to make it go up in voltage. When the voltage at the switching node (351/451) of the primary converter (300/400) is being charged or going up in voltage, the discharging switch 950 of the ring generator device may be activated or turned on to discharge the voltage at the switching node 980 of the ring generator device (310/410) or to make it go down in voltage. The charging switch 910 and the discharging switch 950 generally turns on and off alternately. The arithmetic summing effect of the two electro-magnetic interference signals, one from the primary converter and the other from the ring generator device, is introduced. The primary converter (300/400) and the ring generator device (310/410) are synchronized and operate in an inverse phase with each other to generally cancel the electro-magnetic interference signal created by the primary converter. The primary converter (300/400) and the ring generator device (310/410) normally operate side by side and in inverse phase with each other. The electro-magnetic interference signals may be cancelled by law of superposition.

The present invention encapsulates any set of switching converters which are coupled in timings of both turn-on and turn-off, and of which phase nodes alternate in inverse relation to each other. The present invention includes, but is not limited to, MOSFET, BJT, IGBT, thyristers, synchronous topology, asynchronous topology, buck topology, boost topology, buck-boost topology, Cuk topology, SEPIC topology, isolated topology, and non-isolated topology. This invention may include converters which operate in the discontinuous mode.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing methods of cancellation of electro-magnetic noise according to the present invention will be apparent to those skilled in the art. Various aspects of the invention have been described above by way of illustration, and the specific embodiments disclosed are not intended to limit the invention to the particular forms disclosed. The particular implementation of methods of cancellation of electro-magnetic noise may vary depending upon the particular context or application. By way of example, and not limitation, the methods of cancellation of electro-magnetic noise described in the foregoing were principally directed to switching regulator implementations; however, similar techniques may instead be applied to digital clock generator circuits or digital logic circuits, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
a primary converter device, the primary converter device being operable to supply power to at least one load device, the primary converter device comprising;
a primary switching node, said primary switching node being operable to at least indicate a charged or discharged state of said primary converter device;
a ring generator device, wherein said ring generator device being configured to generate a ringing waveform that is approximately an inverse phase of a phase of said primary converter device, said ring generator device comprising;
a ring generator switching node, said ring generator switching node being operable to at least indicate a charged or discharged state of said ring generator device;
a source voltage, wherein said source voltage comprising at least a voltage approximately equal to an input voltage of said primary converter device;
a ring generator charging switch component, wherein closing said ring generator charging switch component is configured to increase a voltage across said ring generator switching node; and
a ring generator discharging switch component, wherein closing said ring generator discharging switch component is configured to discharge said voltage across said ring generator switching node; and
a common substrate, wherein said primary converter device and said ring generator device is implemented side by side on said common substrate.

2. The apparatus as recited in claim 1, further comprising at least a resistor and a capacitor connected in series that is configured to couple said primary switching node and said ring generator switching node.

3. The apparatus as recited in claim 1, in which said primary converter device is configured to at least operate as a buck or a step-down converter device.

4. The apparatus as recited in claiml, further comprising at least a common clock, wherein said common clock is fed to said primary converter device and said ring generator device, and wherein said ring generator device is configured to operate in synchronization with said primary converter device.

5. The apparatus as recited in claim 4, in which said ring generator device is disposed in relatively close physical proximity with said primary converter device in said common integrated circuit substrate.

6. The apparatus as recited in claim 5, in which said primary converter device further comprising;
a primary charging switch component, wherein closing said primary charging switch component is configured to increase a voltage across said primary switching node and close the ring generator discharging switch component; and a primary discharging switch component, wherein closing said primary discharging switch component is configured to discharge said voltage across said primary switching node and close the ring generator charging switch component.

7. The apparatus as recited in claiml, in which said common substrate comprising at least one of a common printed circuit assembly substrate and a common integrated circuit substrate shared by said ring generator device and the primary converter device operating side by side.

8. The apparatus as recited in claim 1, in which said primary converter device is configured to at least operate as a boost or a step-up converter device.

9. A system comprising:
means for supplying power to at least one load device;
means for creating a primary electro-magnetic interference signal at a primary switching node;
means for operating in at least a phase inverted synchronous mode with said means for supplying power, wherein the phase of said means for supplying power is an inverse of the phase of the means for operating in a phase inverted synchronous mode, the operation of the means for supplying power is synchronous to the operation of the means for operating in a phase inverted synchronous mode and operating on the same clock signal;
means for creating a noise cancellation electro-magnetic interference signal at a secondary switching node, wherein the noise cancellation electro-magnetic interference signal are synchronized and operate in inverse phase with said primary electro-magnetic interference signal, thereby, creating a resultant electro-magnetic interference signal, which is an algebraic sum of the primary electro-magnetic interference signal and the noise cancellation electro-magnetic interference signal, and wherein said resultant electro-magnetic interference signal having a substantially reduced amplitude;
means for adjusting at least one of a frequency and amplitude of at least one of the primary electromagnetic interference signal and the noise cancellation electromagnetic interference signal; and
means for operatively connecting said means for supplying power and said means for operating in a phase inverted synchronous mode.

10. A system comprising:
a primary converter device, the primary converter device being operable to supply power to at least one load device, the primary converter device comprising;
a primary switching node, said primary switching node being operable to at least indicate a charged or discharged state of said primary converter device;
a ring generator device, wherein said ring generator device being configured to generate a ringing waveform that is approximately an inverse phase of a phase of said primary converter device, said ring generator device comprising;
a ring generator switching node, said ring generator switching node being operable to at least indicate a charged or discharged state of said ring generator device;
a source voltage, wherein said source voltage comprising at least a voltage approximately equal to an input voltage of said primary converter device;
a ring generator charging switch component, wherein closing said ring generator charging switch component is configured to increase a voltage across said ring generator switching node; and a ring generator discharging switch component, wherein closing said ring generator discharging switch component is configured to discharge said voltage across said ring generator switching node;

a common substrate, in which said common substrate comprising at least one of a common printed circuit assembly substrate and a common integrated circuit substrate shared by said ring generator device and said primary converter device and operating side by side; and an RC network, in which said RC network comprising at least a resistor and a capacitor connected in series, wherein said RC network is configured to couple said primary switching node and said ring generator switching node.

* * * * *